E. E. NOLAN.
TUBULAR RECEPTACLE.
APPLICATION FILED DEC. 26, 1913.
1,130,322.
Patented Mar. 2, 1915.
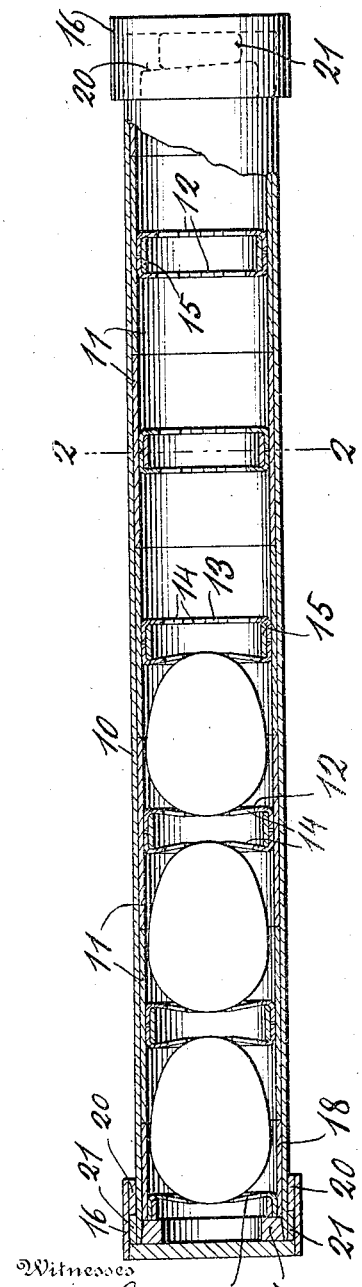
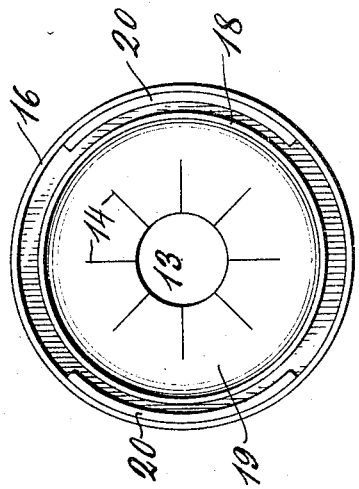
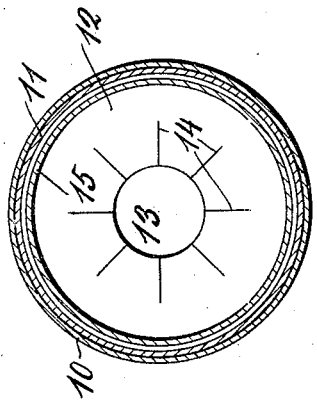
Inventor
Edward E. Nolan.

UNITED STATES PATENT OFFICE.

EDWARD E. NOLAN, OF CHICAGO, ILLINOIS.

TUBULAR RECEPTACLE.

1,130,322.

Specification of Letters Patent.

Patented Mar. 2, 1915.

Application filed December 26, 1913. Serial No. 808,855.

*To all whom it may concern:*

Be it known that I, EDWARD E. NOLAN, a citizen of the United States, residing at Chicago, in the county of Cook and State of Illinois, have invented certain new and useful Improvements in Tubular Receptacles, of which the following is a specification.

This invention relates to paper receptacles designed, more particularly, for shipping eggs, and its object is to provide a receptacle having novel and improved means for holding the eggs so that they may be shipped in the receptacle without danger of breakage.

The invention provides a simple and cheap egg-carrier adapted for the shipment of eggs by parcel post, and it consists in a combination and arrangement of parts to be hereinafter described and claimed.

In order that the invention may be better understood, reference is had to the accompanying drawing, in which—

Figure 1 is a central longitudinal section of the device, partly in elevation; Fig. 2 is a cross-section on the line 2—2 of Fig. 1, and Fig. 3 is an inside end view of one of the closures for the tube.

Referring specifically to the drawing, 10 denotes a cylindrical tube of any suitable length and material. The tube may be in all respects similar to an ordinary mailing tube, and made of paste-board as usual. In the tube are removable, cushioned spacing devices for the eggs. Each of such spacing devices comprises a partition support in the form of a short drum or cylinder 11, on the inside of which, midway between its ends, are located two transverse partitions 12 which are spaced a short distance from each other. Each partition has a central aperture 13 from which extend radial slits 14 dividing the partitions into a series of flexible tongues. The partitions are made of paste-board or similar cheap material, and they are fastened at their outer ends to a ring 15. Adjacent to the ring the partitions are bent back in a curve and pasted or otherwise secured to the outer surface of the ring, which latter may also be made of pasteboard or other suitable cheap material. The partitions may be fastened in the drums 11 by being pasted thereto.

In use, the eggs are placed in the tube 11, end to end, in spaced relation, in which position they are held by the partitions 12. After the first egg is placed in the tube, a drum 11 is inserted and advanced in the tube until it slips over the egg and one of its partitions engages one end of the egg. Another egg is then inserted to come endwise against the other partition of the aforementioned drum, and another drum is inserted, and then another egg, and so on until the tube is filled. Ordinarily, the tube will be made long enough to hold six eggs, but the length of the tube may be varied as desired.

It will be noted from the foregoing that a pair of the partitions 12 is located between the opposite ends of adjacent eggs, and the eggs are therefore held spaced from each other in endwise relation. The tongues formed by the slits 14 are resilient which allows a slight endwise movement of the eggs, but the spacing of the respective members of the pairs of partitions is such that the endwise movement is not enough to bring the eggs in contact with each other. As the drums 11 are separate they readily adjust themselves to the dimensions of the eggs along their major axis.

Each end of the tube is provided with a closure in the shape of a cap 16 carrying an internal ring 17 which is beveled on the outside to fit snugly within the tube, whereby the circulation of air inside the tube is prevented and an air cushion is produced. The ring also carries a drum 18 having a partition 19 similar to the partitions 12 hereinbefore described. The drum is spaced from the side wall of the cap so that the latter may be slipped over the end of the tube. The partitions 19 engage the end eggs of the series, and the drums 18 engage the end ones of the drums 11, whereby the series of said drums are held against sliding back and forth in the tube. The inside of the tube and the caps may be paraffined to render the same moisture-proof. On the inside of the side wall of the caps are diametrically opposite lugs 20 which are adapted to be positioned behind lugs 21 on the tube by slipping the caps on the tube and then giving the same a slight turn. The contiguous edges of the lugs are inclined to produce a wedging action and securely hold the caps in place.

The structure herein described provides a simple and cheap egg carrier, and one which permits the eggs to be shipped without danger of being broken in transit, in view of which the receptacle is admirably adapted for use in the shipment of eggs by parcel post. A number of receptacles can be shipped together by being packed in a box or case.

I claim:

1. The combination with a tubular receptacle, of a series of transverse partitions therein, said partitions being arranged in pairs, the members of which are spaced apart, and a separate support for each pair of partitions, said partition supports being removably mounted in the receptacle in end-to-end relation.

2. The combination with a tubular receptacle, of a series of transverse partitions therein, said partitions being arranged in pairs, the members of which are spaced apart, a separate support for each pair of partitions, said partition supports being removably mounted in the receptacle in end-to-end relation, and end closures for the receptacle, said closures having means for holding the partition supports in end-to-end contact.

3. The combination with a tubular receptacle, of a series of separate drums removably mounted therein in end-to-end relation, a pair of transverse partitions in each drum intermediate the ends thereof, the members of said pair being spaced apart, and end closures for the receptacle, said closures having means for holding the drums in end-to-end contact.

4. The combination with a tubular receptacle, of a series of drums removably mounted therein end to end, transverse partitions in the drums intermediate the ends thereof, and caps closing the ends of the receptacle, said caps carrying drums engageable with the end drums of the aforesaid series of drums, and said drums of the caps also having transverse partitions, In testimony whereof I affix my signature in presence of two witnesses.

EDWARD E. NOLAN.

Witnesses:
 FRED G. NOLAN,
 EDWIN A. RICKSON